US007627592B2

(12) United States Patent
Crockett et al.

(10) Patent No.: US 7,627,592 B2
(45) Date of Patent: Dec. 1, 2009

(54) SYSTEMS AND METHODS FOR CONVERTING A FORMATTED DOCUMENT TO A WEB PAGE

(75) Inventors: Sterling John Crockett, Bothell, WA (US); Nathan James Fink, Seattle, WA (US); William James Griffin, Sammamish, WA (US); Bruce Arville Jones, Des Moines, WA (US); George Perantatos, Seattle, WA (US); Ryan Robert Stocker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 11/013,765

(22) Filed: Dec. 16, 2004

(65) Prior Publication Data

US 2006/0136353 A1 Jun. 22, 2006

(51) Int. Cl.
*G06F 7/00* (2006.01)
*G06F 17/00* (2006.01)

(52) U.S. Cl. .................. 707/101; 707/100; 707/102; 707/103 R; 707/104.1; 715/202; 715/206; 715/221; 715/234; 715/239

(58) Field of Classification Search ...... 707/100–104.1; 715/204, 206, 221, 234, 235, 239
See application file for complete search history.

(56) References Cited

U.S. PATENT DOCUMENTS

| | | | | |
|---|---|---|---|---|
| 5,845,299 | A * | 12/1998 | Arora et al. | 715/209 |
| 5,963,205 | A | 10/1999 | Sotomayor | |
| 6,230,173 | B1 | 5/2001 | Ferrel et al. | |
| 6,523,034 | B1 * | 2/2003 | Hoyt et al. | 707/10 |
| 6,678,867 | B2 * | 1/2004 | Fong et al. | 715/239 |
| 7,024,415 | B1 * | 4/2006 | Kreiner et al. | 707/101 |
| 2002/0152245 | A1 * | 10/2002 | McCaskey et al. | 707/530 |
| 2004/0103370 | A1 | 5/2004 | Chiang et al. | |
| 2006/0036964 | A1 * | 2/2006 | Satterfield et al. | 715/777 |

OTHER PUBLICATIONS

Rahman et al., "Conversion of PDF documents into HTML: a case study of document image analysis", IEEE Electronic Library Online, Signals, Systems and Computers, 2003. Conference Record of the Thirty-Seventh Asilomar Conference, Nov. 2003. vol. 1; pp. 87-91. downloaded: http://ieeexplore.ieee.org/stamp/stamp.jsp?tp=&arnumber=1291873&isnumber=28782.*

(Continued)

*Primary Examiner*—Jean B. Fleurantin
*Assistant Examiner*—Hares Jami
(74) *Attorney, Agent, or Firm*—Merchant & Gould P.C.

(57) ABSTRACT

Systems and methods for transforming a document to a web page can include a mapping module programmed to map document styles of a document to styles of a web page. The system can also include a conversion module programmed to convert contents of the document into hypertext markup language based on the map of the mapping module, and a rendering module programmed to render the web page based on the hypertext markup language. A method can include mapping document styles in a document to styles of a web page, converting contents of the document into hypertext markup language based on the mapping, and rendering the web page based on the hypertext markup language.

17 Claims, 13 Drawing Sheets

OTHER PUBLICATIONS

European Search Report mailed Jan. 23, 2008.

Jackson, K. et al., "Web Books: Publishing Large Scientific and Technical Documents Simultaneously on the World Wide Web and on paper," *Proc. STC 43rd Annu. Conf.*, p. 391 (1996).

Rauch, T. et al., "Enabling the book metaphor for the World Wide Web: Disseminating on-line information as dynamic Web documents," *IEEE Transactions on Professional Communication*, vol. 40, No. 2, pp. 111-128 (Jun. 1997).

Xu et al., "Automatic Online System of Chinese Science Periodicals", J Tsinghua Univ (Sci & Tech), 2001, vol. 41, No. 9, pp. 122-125.

* cited by examiner

SYSTEMS AND METHODS FOR CONVERTING A FORMATTED DOCUMENT TO A WEB PAGE

TECHNICAL FIELD

Embodiments of the present invention relate to systems and methods for transforming a document to a web page.

BACKGROUND

Many computer users are familiar with and adept at using word processing applications such as Microsoft® Word to create documents. Such documents can include various styles to create desired formatting, as well as other elements such as tables, lists, and embedded resources like images and binary files.

While a document created using a word processing application can easily be converted to a printed form that closely approximates the styles and elements selected by the user to create the document, such a document may not be easily publishable on a web site. For example, the various document styles, elements, and resources embedded in a document may not be compatible with the format used to present content on a web page.

Further, while word processing applications allow for flexibility in the styles and elements that are used to create a document, web pages that are created by simply converting a document to a web-compatible format such as hypertext markup language (HTML) may not fit into the "look and feel" of the pages for a particular web site. For example, many web sites have a consistent format (e.g., font types and sizes, colors, image locations, etc.) that is used for each page so that the look and feel of the site is relatively uniform as a user navigates through the site's pages. However, a page created through simple conversion of a document created by a word processing application may not fit into the style of a particular web site.

For example, a user can use a word processing application to create a document that subsequently needs to be added to a web site. The document can include various styles and elements available in the word processing application. To convert the document to a web page, typically the contents of the document is copied into a text editing program to remove all formatting, and the contents is then copied into an HTML editor such as Microsoft® FrontPage® so that the contents can be formatted as desired to reflect the site's formatting. In addition, any resources (e.g., images, binary files) embedded in the document are manually copied to a desired location on the web server, and links to the resources are manually recreated on the web page using the HTML editor. Such a process for manually converting a document to a web page can be cumbersome and time-consuming.

It is therefore desirable to provide systems and methods that can transform documents to web pages that can be displayed using a web browser.

SUMMARY

Embodiments of the present invention relate to systems and methods for transforming a document to a web page.

One example embodiment of the invention relates to a computing system including a mapping module programmed to map document styles of a document to styles of a web page, a conversion module programmed to convert contents of the document into hypertext markup language based on the map of the mapping module, and a rendering module programmed to render the web page based on the hypertext markup language.

Another example embodiment of the invention relates to a method for transforming a document to a web page, the method including mapping document styles in a document to styles of a web page, converting contents of the document into hypertext markup language based on the mapping, and rendering the web page based on the hypertext markup language.

Yet another example embodiment of the invention relates to a computer-readable medium having computer-executable instructions for performing steps including mapping document styles in a document to styles of a web page, converting contents of the document into hypertext markup language based on the mapping, and rendering the web page based on the hypertext markup language.

BRIEF DESCRIPTION OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention relate to systems and methods for transforming a document to a web page.

In example embodiments, a document including styles and elements is transformed into a web-compatible format such as hypertext markup language (HTML) so that the contents of the document can be displayed as a web page. This transformation can be accomplished by mapping styles in the document to styles for the web page.

Figure 1:
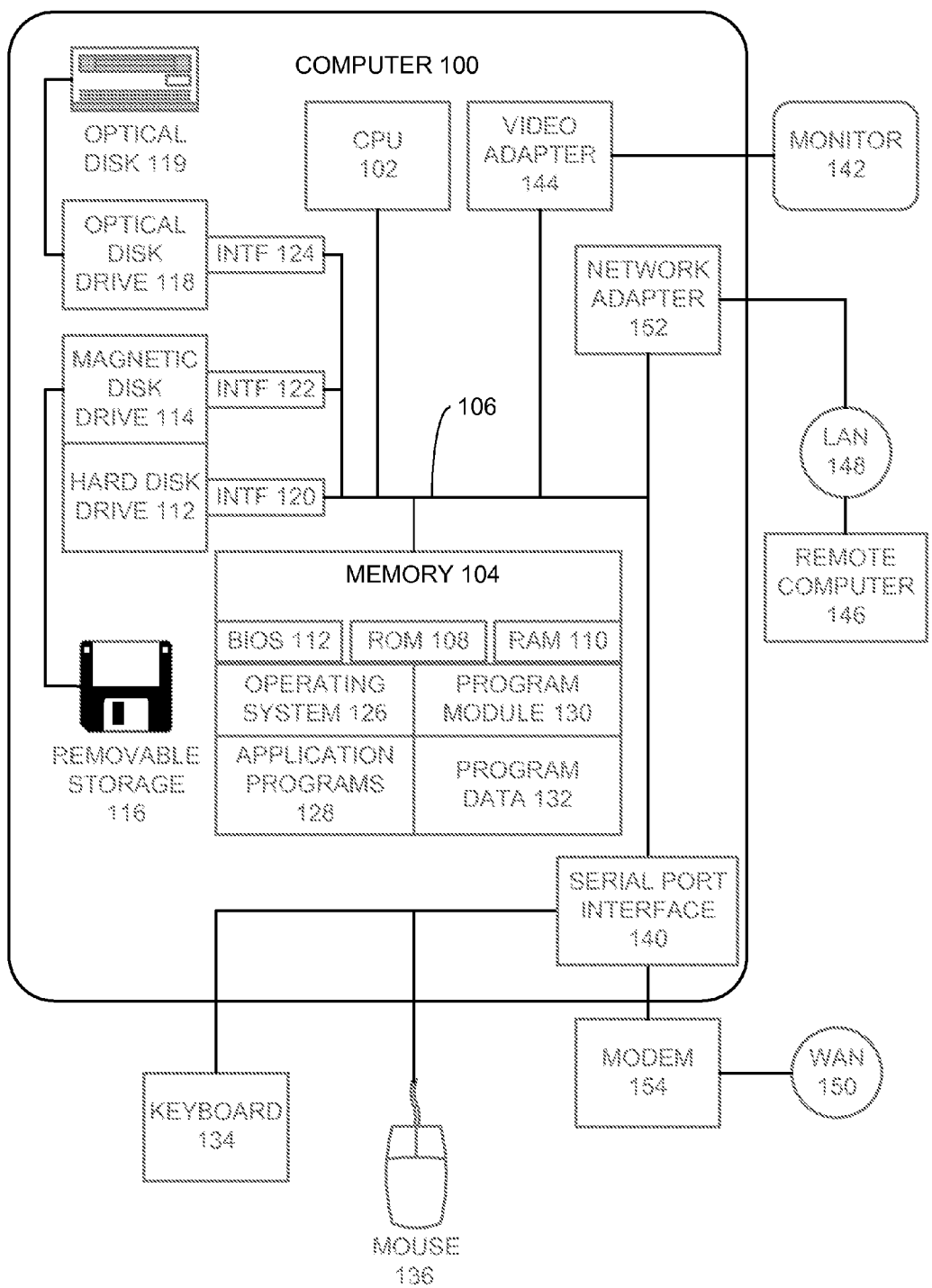
FIG. 1 illustrates example general purpose computing system according to one embodiment of the present invention.

Referring now to FIG. 1, a document including styles and elements such as tables, lists, and embedded resources can be created on an example computer system 100. For example, the document can be created on computer system 100 using application programs 128 such as Microsoft® Word, Excel, or PowerPoint®. Other applications can also be used to create the document.

Computer system 100 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
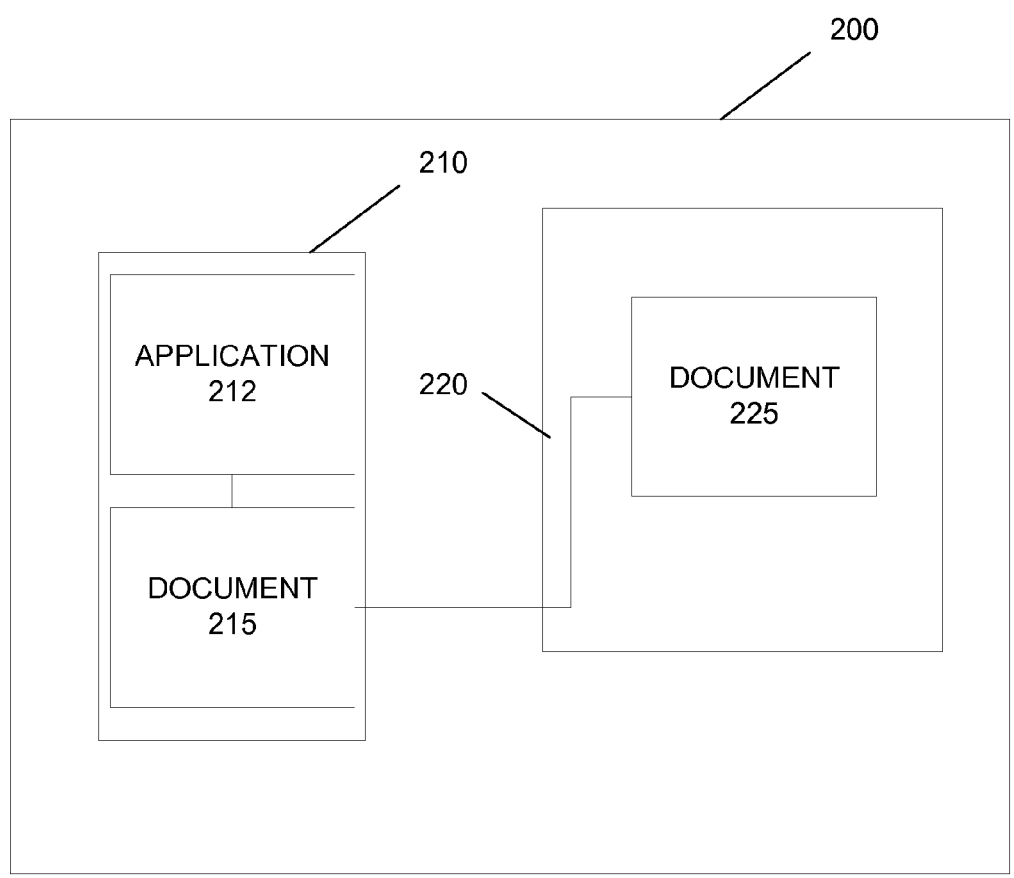
FIG. 2 illustrates an example computing system according to another embodiment of the present invention.
Figure 3:
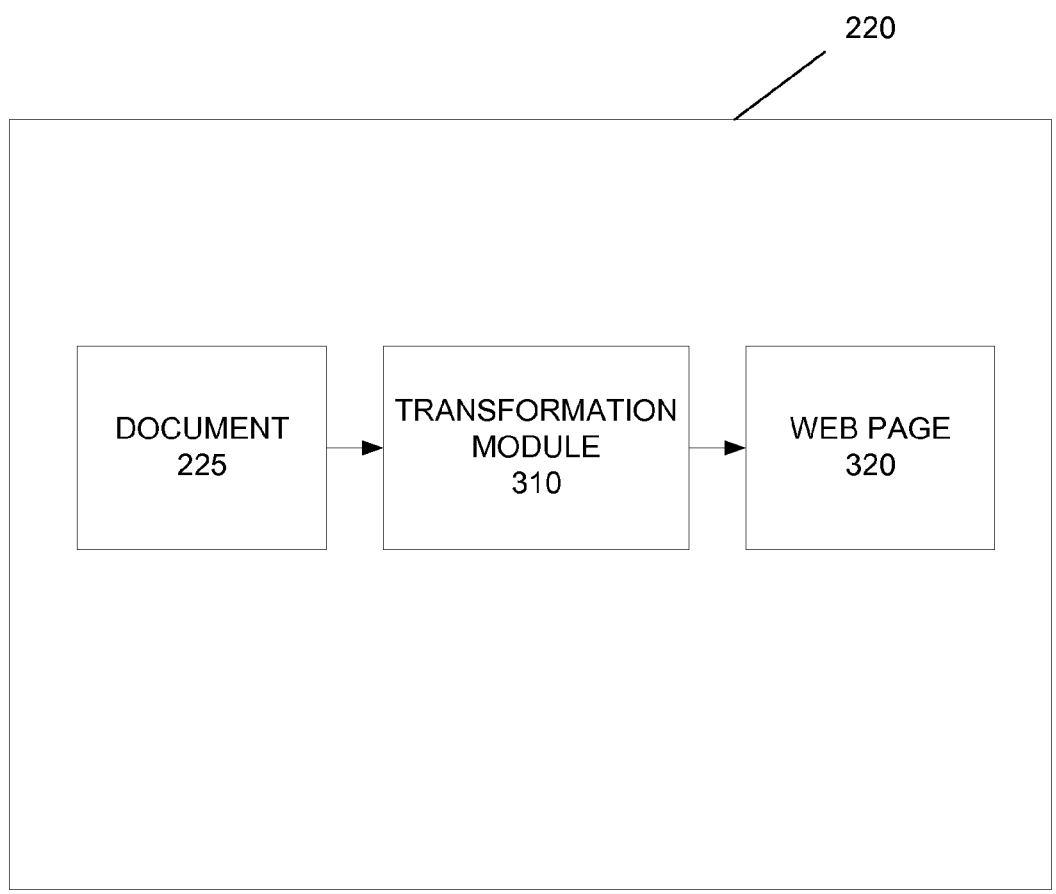
FIG. 3 illustrates an example server according to one embodiment of the present invention.
Figure 4:
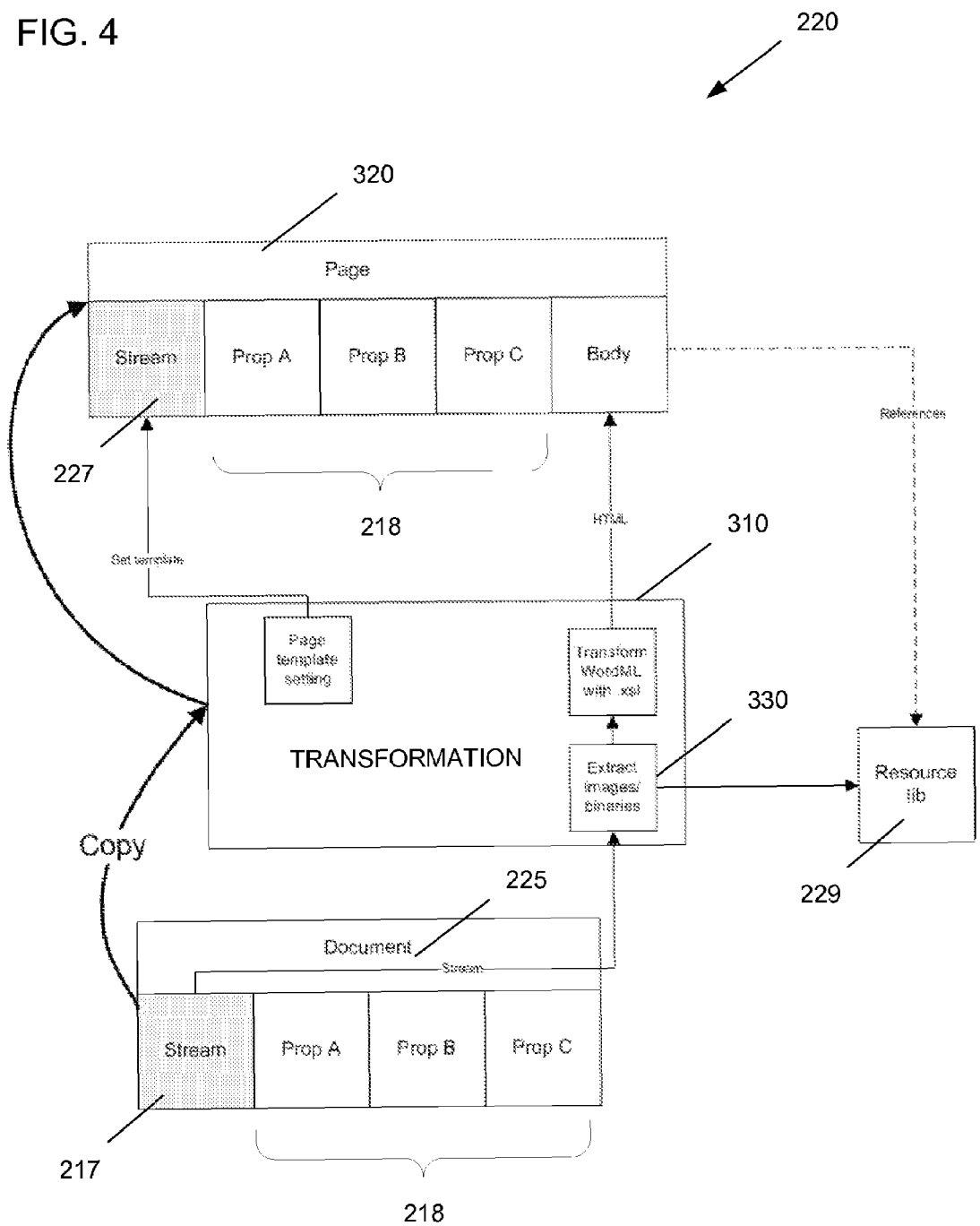
FIG. 4 illustrates the server of FIG. 3 in more detail.

Referring now to FIGS. 2-4, an example system 200 is illustrated. System 200 includes a computer system 210 and a server 220. System 210, which can be configured in a manner similar to computer system 100 described above, includes an application 212 and a document 215. In example embodiments, application 212 is Microsoft® Word, Excel, or PowerPoint®. Other applications can also be used.

For example, Microsoft® Word can be used to create document 215. Document 215 includes content 217 and metadata 218. Document 215 can include certain styles that are used to define how content such as text, tables, and lists is formatted. In addition, document 215 can include embedded resources, such as images and binary files.

Once document 215 is created and saved by application 212 on computer system 210, document 215 can be uploaded to server 220 as document 225. In example embodiments, server 220 is a Microsoft® SharePoint™ Portal Server. Other types of servers can also be used.

Once document 225 is on server 220, document 225 can be transformed to a web page 320. For example, a transform module 310 can be used to transform document 225 to HTML content 227 that can be displayed as web page 320, and any resources are extracted by a resource extraction module 330 to a resource library 229, as described further below. In example embodiments, the transformation module 310 is configured so that the resulting web page 320 has formatting similar to that of other web pages on the specific web site.

Figure 5:
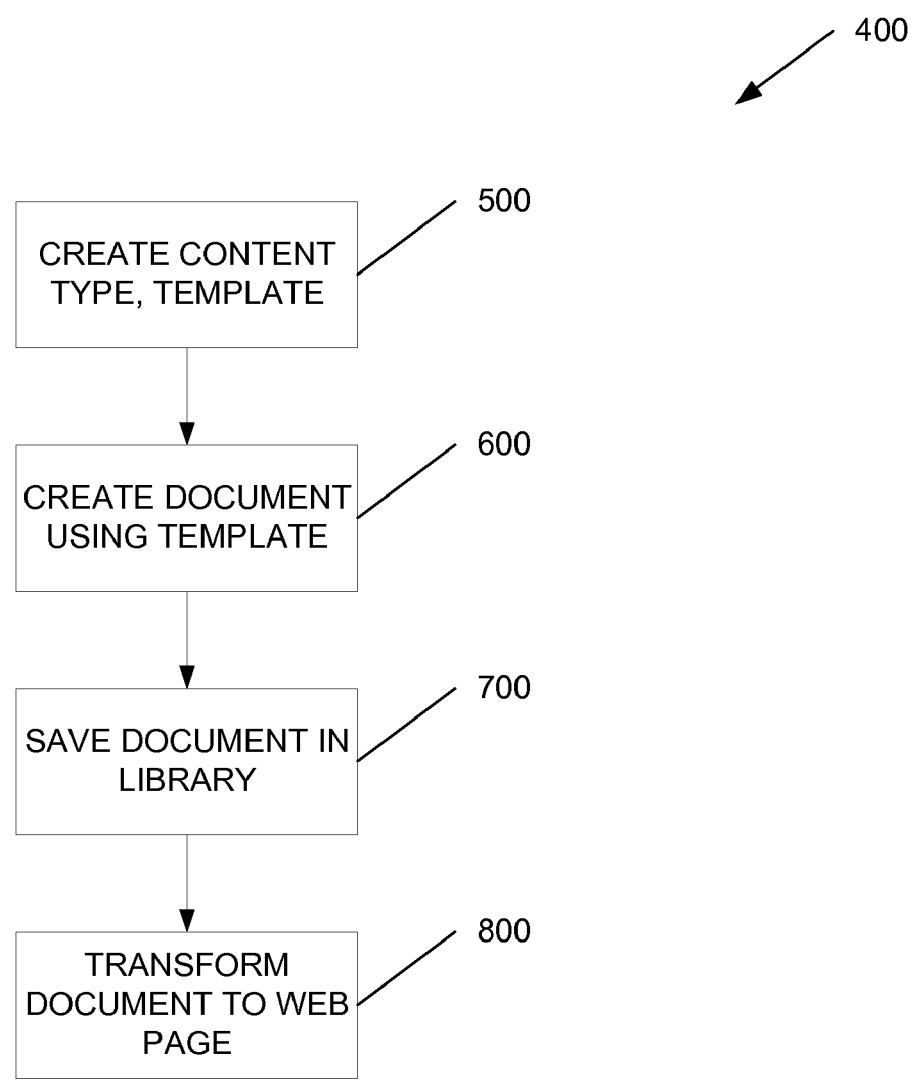
FIG. 5 illustrates an example method for creating and transforming a document into a web page according to one embodiment of the present invention.

Referring now to FIG. 5, an example method 400 is illustrated for creating a document and transforming the document to a web page. Generally, method 400 includes creation of a content type and document template at operation 500. The content type defines the document properties available to a particular document, such as metadata, workflow required to approve documents of this type, retention policies for this type of document, etc. One property of the content type is the document template that is used to create items of the given content type. The document template is the starting instance of a document in a given format that is created when a user selects the document template associated with a given content type.

A document is created using, for example, the template at operation 600. For example, the document can be created using an application such as Microsoft® Word, Excel, or PowerPoint®. When a new document is created for a specified content type, the template associated with the content type is used to define the styles available for the document. In some embodiments, the template includes default styles and other components associated with the documents (e.g., required images like a banner).

In example embodiments, at least some of these default components cannot be modified by the user. For example, in some embodiments, the template selected to create the document can restrict the document author to certain formatting styles (e.g., Heading 1, Heading 2, Body Text, and Bullet List) to assist in transformation, as described further below. The template can also define certain in-line named fields having names like Title and Abstract. As described in detail below, these styles and/or in-line fields can be used during transformation to convert the document to a web page.

In other embodiments, the document can be created without the use of a template.

Next, the document is saved in a document repository at operation 700. Finally, the document is transformed at operation 800 to create HTML for a web page.

Each of the steps of method 400 is described in greater detail below.

I. Content Type and Template Definitions

Figure 6:
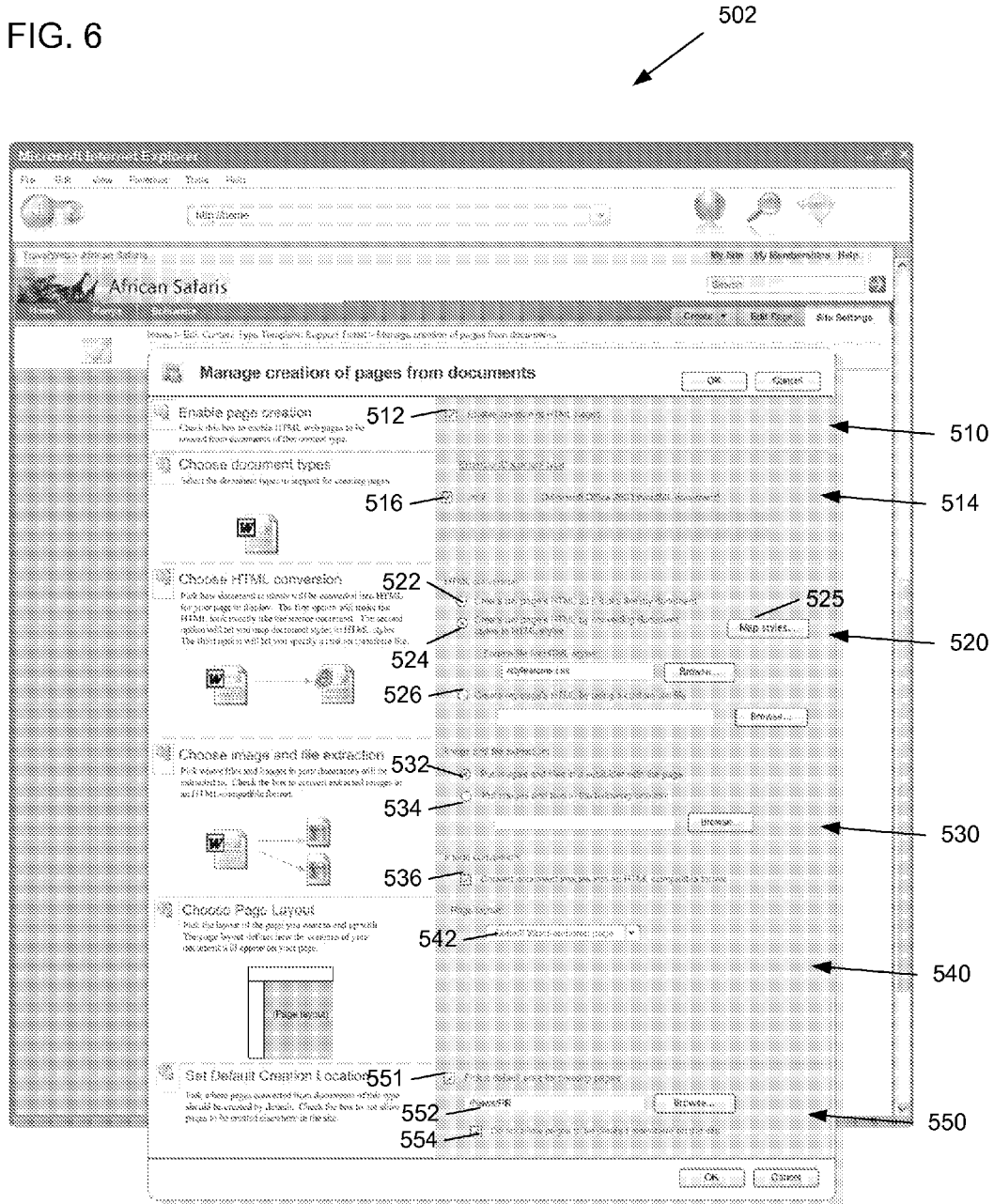
FIG. 6 illustrates an example user interface for defining transformation for a content type according to one embodiment of the present invention.

Referring now to FIG. 6, an example user interface 502 is shown for setting up transformation for a content type. User interface 502 includes an enable page creation section 510 including a check box 512. If the check box 512 is selected, the remaining options presented by user interface 502 are enabled and transformation can be implemented as described below. If the check box 512 is not selected, the remaining options presented by user interface 502 are disabled. In addition, transformation for the content type cannot be conducted when the check box 512 is not selected. In one example, the check box 512 is unselected by default.

A document type section 514 of user interface 502 allows the user to select which document types can be transformed. In the example shown, check box 516 is selected so that Microsoft® Word documents with the ".xml" extension can be transformed. In other embodiments, additional document types can be listed or removed. Other example document types include ".xls" document extensions associated with documents created using Microsoft® Excel, and ".ppt" document extensions associated with documents created by Microsoft® PowerPoint®.

A conversion section 520 of user interface 502 allows the user to configure how the document is transformed into HTML. In the example shown, the user can select between radio buttons 522, 524, and 526. If radio button 522 is selected, the styles associated with the document are transformed to HTML without alterations. In other words, formatting in the document is carried over into the HTML so that the web page closely approximates the formatting in the document. If radio button 524 is selected, the styles in the document are mapped to particular styles for the HTML, as described further below. Finally, if radio button 526 is selected, a user can select a custom extensible stylesheet language (XSL) file that is used to transform an extensible markup language (XML) document to HTML. In alternative embodiments, an additional option can be provided to allow for the use of additional conversion modules that can be plugged into the transformation module.

Figure 7:
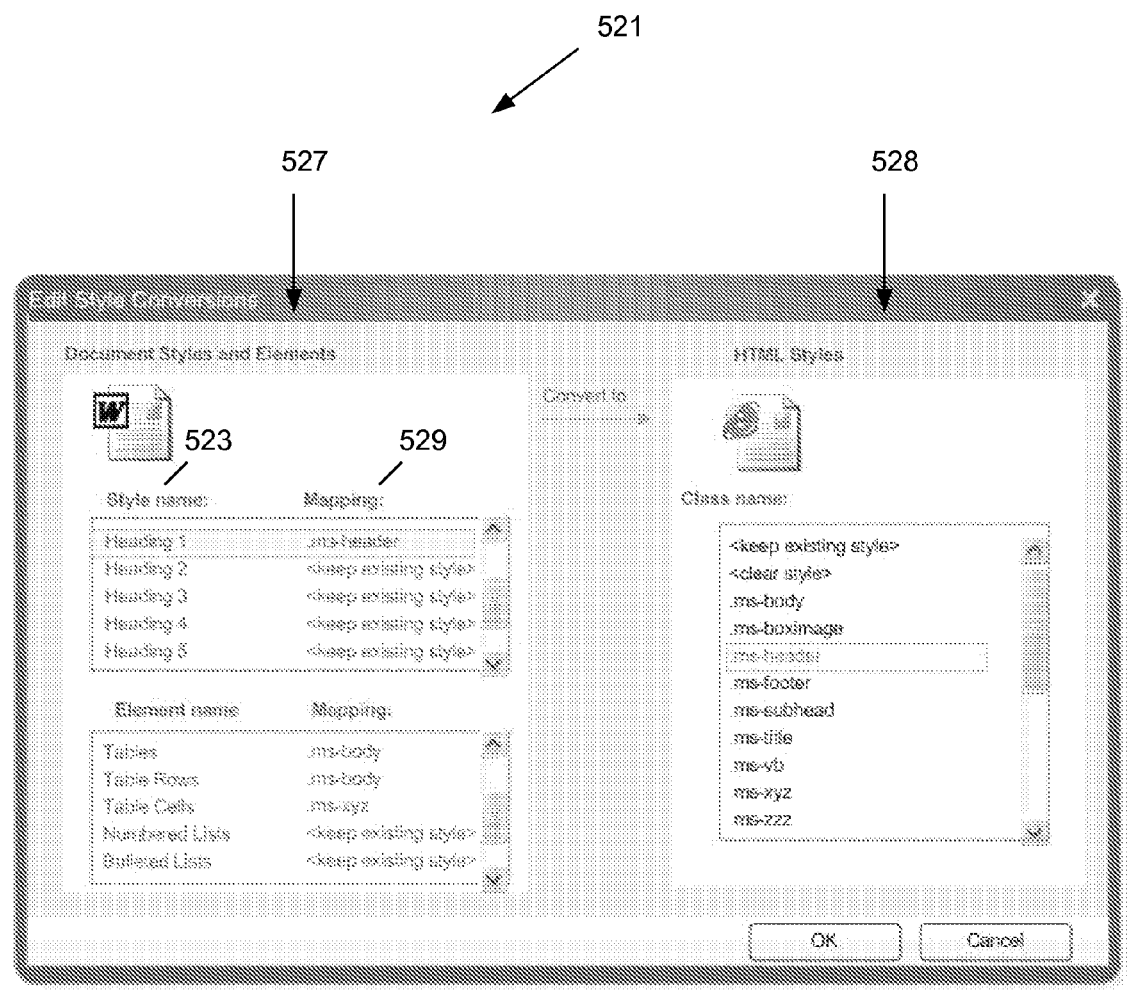
FIG. 7 illustrates an example dialog box for mapping document styles to hypertext markup language styles according to one embodiment of the present invention.

If radio button 524 is selected, the user is allowed to define how styles and elements associated with a document template used to create a document are transformed into HTML. For example, in the illustrated embodiment, a dialog box 521 (as shown in FIG. 7) appears when the user selects the "map styles" button in conversion section 520. Dialog box 521 includes a column 527 enumerating a list of document styles and other common elements 523 (e.g., tables, lists, hyperlinks, images, and body text) associated with the document template, and how each style or element is mapped to a cascading style sheet (CSS) class 529 when transformation occurs. Dialog box 521 also includes a column 528 enumerating a list of the available HTML styles that can be selected for a document style or element, as well as two options labeled "<keep existing style>" and "<clear style>". If the user selects "<keep existing style>" in column 528 for a particular style or element in column 527, the style or element in the document is maintained when transformation occurs. If the user selects "<clear style>" in column 528 for a particular style or element in column 527, the style in the document is stripped out and replaced with no style when transformation occurs. In some embodiments, the list in column 528 is sorted alphabetically, and only those HTML styles that can be applied to the particular selected document style or element are listed in column 528.

For example, if document style "Heading 1" in list 523 of column 527 is selected as shown in FIG. 7, CSS class ".ms-header" is listed in list 529 to indicate that the style "Heading 1" will be mapped to the CSS class ".ms-header" when transformation is performed. In addition, column 528 lists the HTML styles available for mapping of the document style or element selected in column 527 and the currently selected style is highlighted. The user can change how the document style "Heading 1" is mapped by selecting a different HTML style from column 528. For example, if CSS class ".ms-footer" is selected, any content in the document associated with the document style "Heading 1" will be mapped to HTML style ".ms-footer" during transformation.

Referring back to FIG. 6, a resource extraction configuration section 530 of user interface 502 allows the user to select a radio button 532 that specifies that extracted resources such as images and binary files embedded in the document are to be saved into a subfolder associated with the web page during transformation. If the user instead selects radio button 534, the user is allowed to specify a particular path location (typically on a server) to which the resources are to be extracted.

As described further below, the extracted resources are automatically linked in the HTML that is created during transformation so that the resources are properly referenced in the resulting web page.

In addition, the user can select a check box 536 to have image resources converted to HTML-compatible format when extracted. For example, image resources in formats such as Bitmap (BMP) and Tagged Image File Format (TIFF) can be automatically converted upon extraction to an HTML-compatible format such as a Portable Network Graphics (PNG) or Joint Photographic Experts Group (JPEG) format. In example embodiments, the image dimensions as displayed in the document are preserved upon extraction. For example, if the original image dimensions are 1000×1000 pixels, but the image is scaled to a size of 200×300 pixel size in the document, the link to the image in the resulting HTML is configured to display the image in the 200×300 pixel size. In some embodiments, the resolution of the image is reduced so that the resulting image is smaller to allow for more efficient downloading when accessed on the web page.

A page layout section 540 of user interface 502 allows the user to define how the web pages for the content type are rendered after transformation. The page layouts listed in section 540 define how the contents of the page are laid out using a set of field controls. A drop down menu 542 allows the user to select among different page layout templates that define how the resulting web page is displayed.

A default creation location section 550 of user interface 502 allows the user to define a default location where page creation will occur upon transformation. The user can set a default path in box 552 if check box 551 is selected. In some embodiments, if the user selects a path that is not valid for hosting of a web page, a warning message is provided and the user can select a different path. In addition, if check box 554 is selected, the user will not be allowed to select a different location for a web page created during transformation, as described below.

II. Document Creation and Saving in Library

Figure 8:
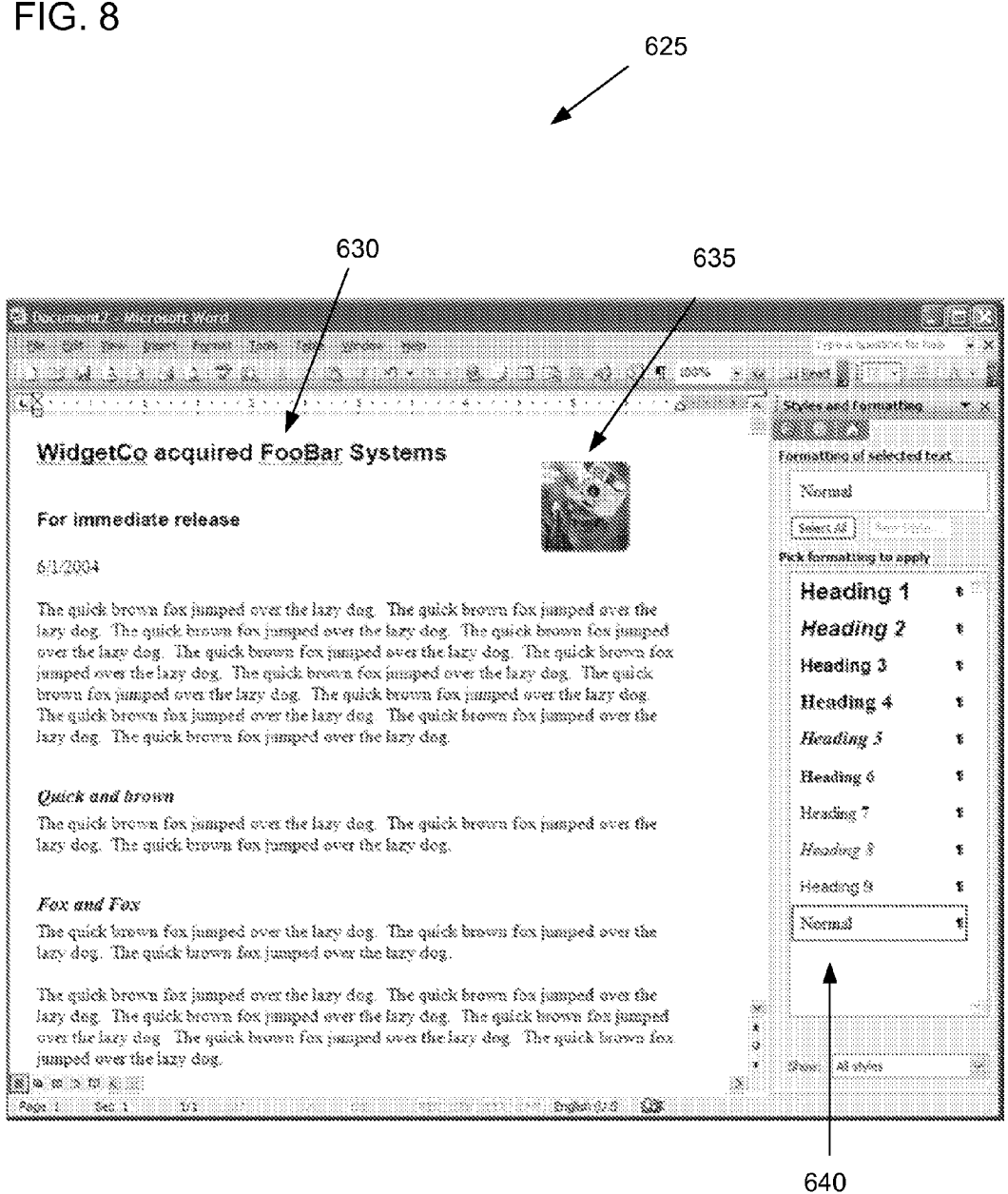
FIG. 8 illustrates an example document created using an application according to one embodiment of the present invention.

Referring now to FIG. 8, documents can be created using a variety of applications. If a new document is created having a content type that supports transformation, the document can be transformed. In the illustrated example, a document 625 is created using Microsoft® Word. The document includes content such as text 630 and embedded image 635. The text 630 is formatted according to various styles 640.

In some embodiments, only styles 640 that are mapped in accordance with the content type to an HTML style are provided so that each document style can be mapped during transformation. In other embodiments, additional documents styles that have not been mapped to HTML styles can be provided. Upon transformation, these document styles can be stripped or mapped to a default HTML style.

Figure 9:
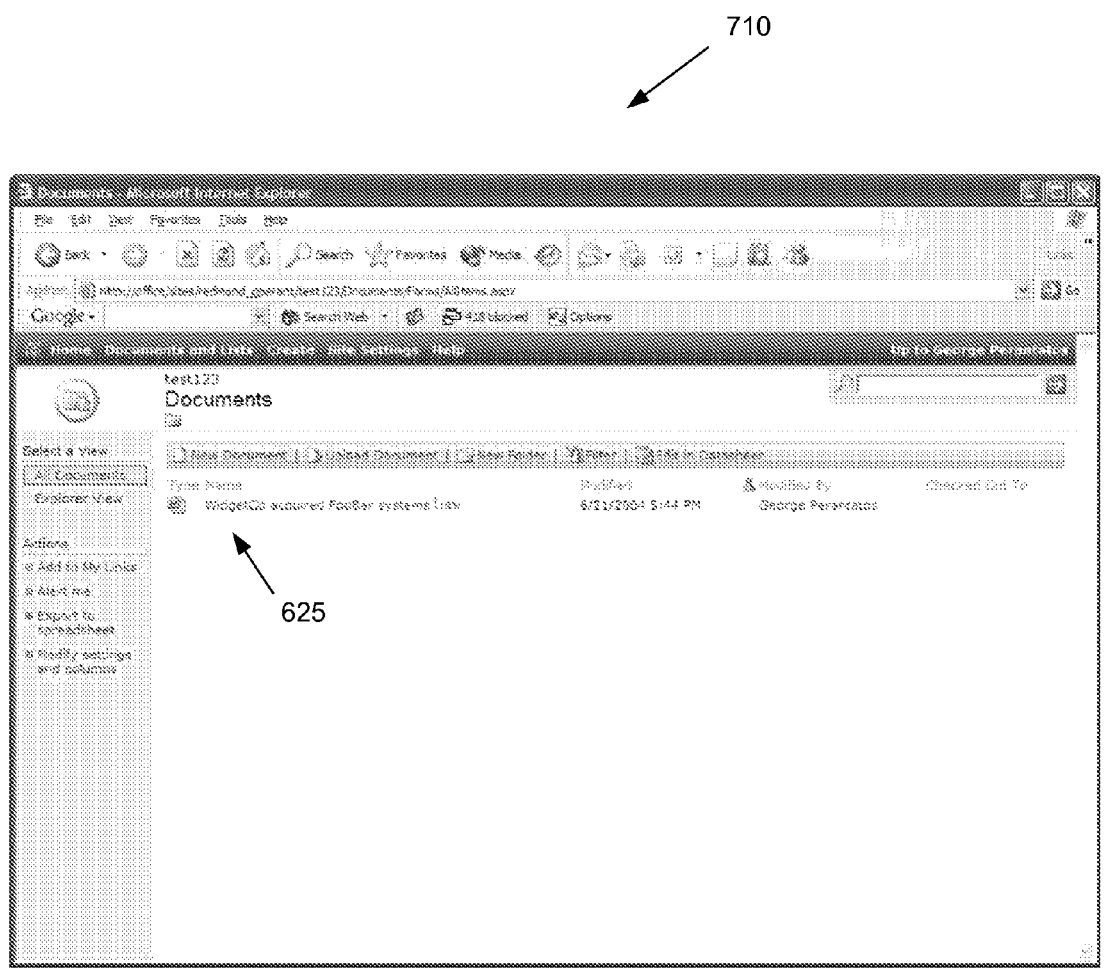
FIG. 9 illustrates an example document library according to one embodiment of the present invention.

Referring now to FIG. 9, when the document is complete, the document 625 is saved in a document library 710, such as a Microsoft® Windows® SharePoint™ Services document library.

Figure 10:
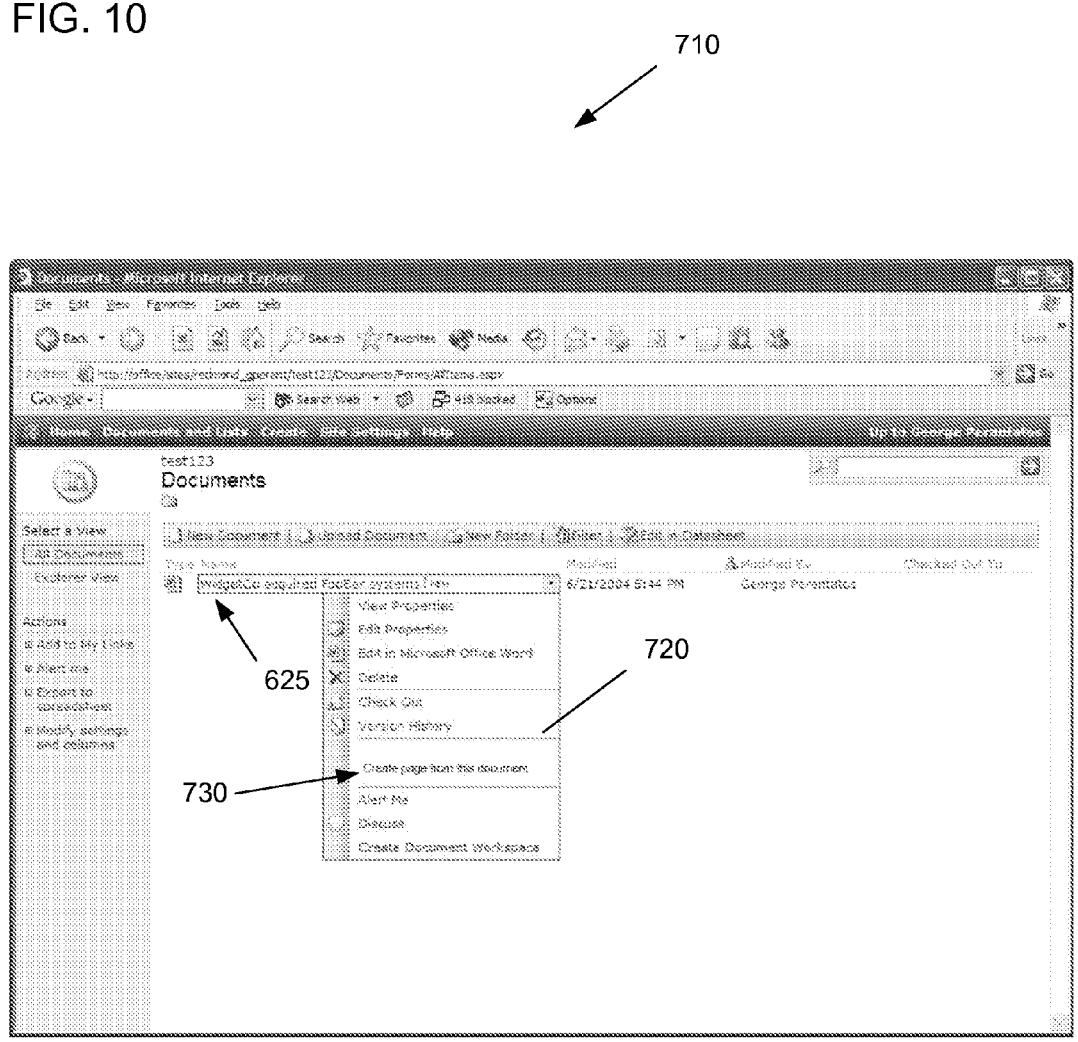
FIG. 10 illustrates the example document library of FIG. 9 with a drop down menu selected.

Referring now to FIG. 10, once the document 625 is saved in library 710, transformation can be started by selecting an example drop down menu 720 associated with document 625. Menu 720 includes an entry 730 that allows the user to create a web page from the document 625. If the user selects entry 730, the transformation begins. In other embodiments, transformation can be started in other ways, such as automatically upon loading of the document into the library, as described further below.

III. Transformation

Figure 11:
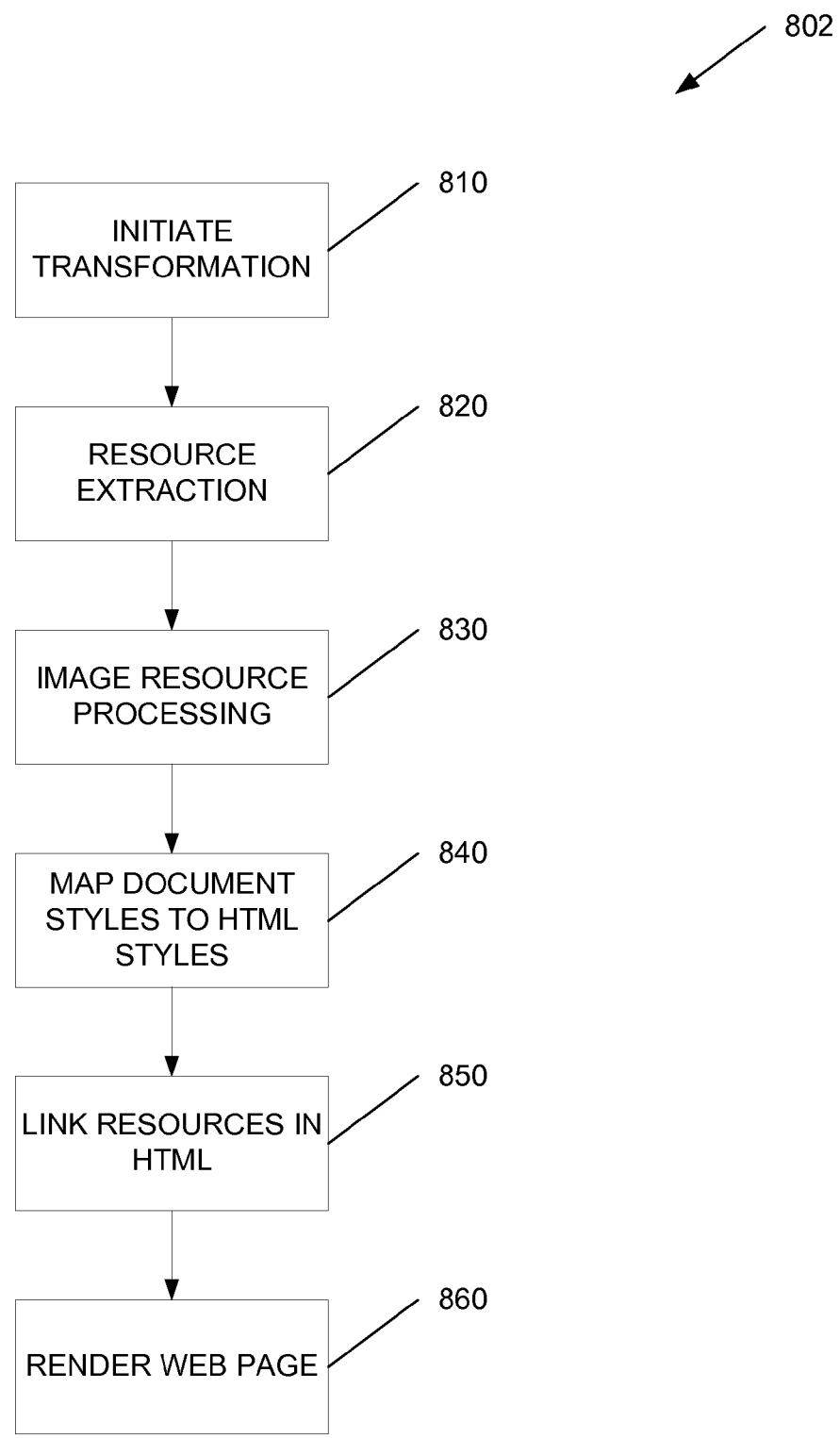
FIG. 11 illustrates an example method for transformation according to one embodiment of the present invention.

Referring now to FIG. 11, an example method 802 for transformation is illustrated. At operation 810, transformation is initiated. In some embodiments, transformation is supported only for certain document content types. Therefore, an error message is displayed and transformation does not occur if an attempt is made to transform an unsupported document content type.

Figure 12:
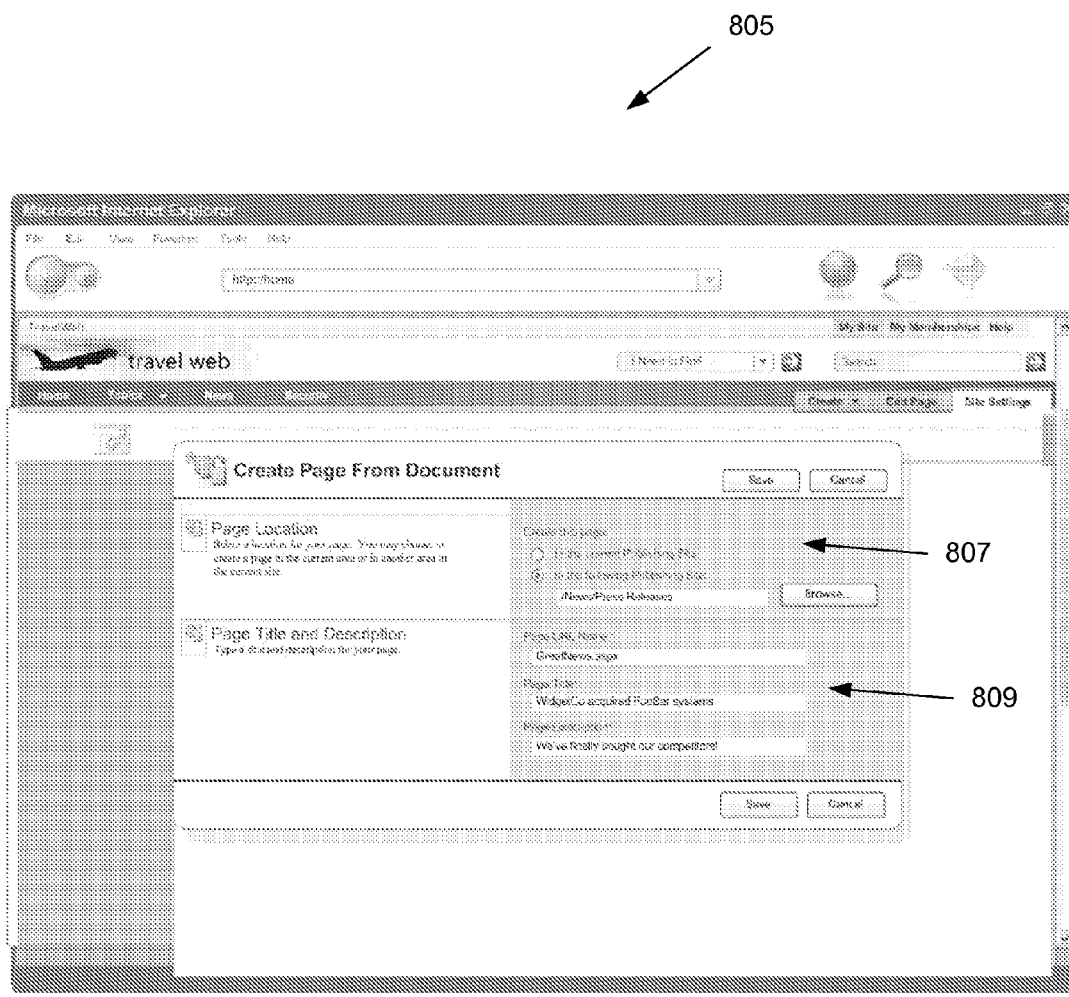
FIG. 12 illustrates an example user interface for defining transformation web page properties according to one embodiment of the present invention.

In addition, when transformation is initiated, an example a user interface 805, illustrated in FIG. 12, is shown to the user. User interface 805 includes a page location section 807 and a page title and description section 809. Page location section 807 allows the user to choose to create the web page in the current publishing site or to select a publishing site. In some embodiments, if check box 554 in user interface 502 (see FIG. 6) was selected when defining the content type, the user is not allowed to select a page location but is instead presented with the default location. The page title and description section 809 allows the user to provide a title and description for the page. Once the user completes sections 807 and 809 and selects "Save", transformation can begin.

Referring back to method 802 shown in FIG. 11, control is next passed to operation 820 and any embedded resources (e.g., image 635) in the document are extracted and saved at the location defined by the content type (see section 530 of user interface 502). In one embodiment, the extracted resources are each given a name according to a naming convention to uniquely identify each resource. For example, each resource can be named according to the naming convention "_<ID>.<extension>". If the location for saving the resources defined by the content type cannot be accessed or otherwise will not allow the resources to be saved, an error message can be displayed and the user can define a different location for saving the extracted resources by editing the content type using section 530 of user interface 502 (see FIG. 6).

Next, in operation 830, any image resources are processed as needed to create HTML-compatible images. Control is then passed to operation 840, and document styles are mapped to HTML styles as defined by the content type (see section 520 of user interface 502).

Next, in operation 850, links are created in the HTML to resources that have been extracted. For example, if the resource is an image, a reference link is provided so that the image is displayed in on the web page as desired. If the resource is an embedded binary file such as a document, a link to the document is provided. In some embodiments, the relationship between the web page and the resources is tracked as described below so that, for example, the resources can be deleted upon deletion of the document and/or web page.

Figure 13:
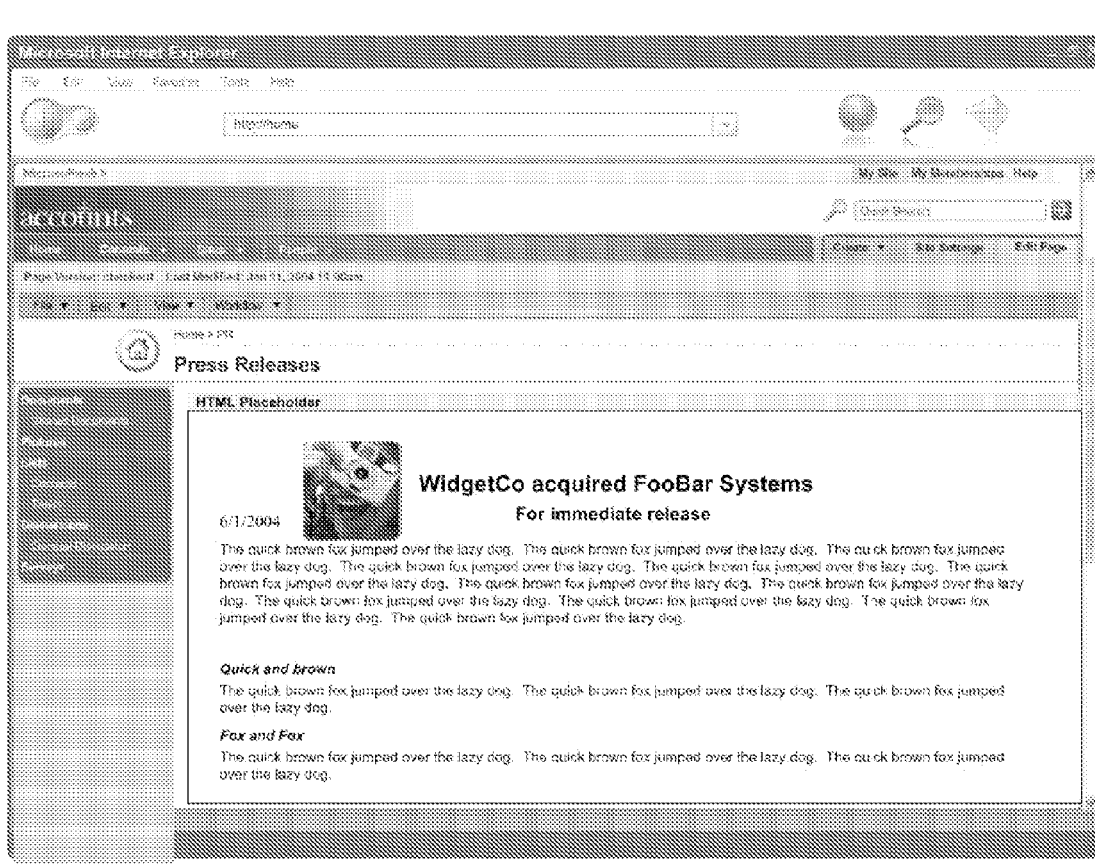
FIG. 13 illustrates an example web page generated by transformation of the document of FIG. 8.

Finally, in operation 860, the web page is rendered. An example web page 870, shown in FIG. 13, is created from transformation of document 625.

In some embodiments, the user can edit either the document or web page after transformation. If the user edits the document, the user can then proceed with transformation again to have the changes to the document be reflected in the web page. In some embodiments, if the user attempts to edit the web page itself, a warning is provided indicating that edits to the web page can be lost if the web page is edited and subsequently the source document is transformed again to create a new web page. In other embodiments, a back link between the page and source document is created so that, if the user attempts to edit the web page itself, the user is automatically referred back to the source document that is opened for editing in the application that was used to create the document. In other embodiments, the user is restricted from editing the web page and must instead edit the source document and then retransform the document. In yet other embodiments, when the user edits a web page created by transformation, the edits are automatically reflected in the source document.

In some embodiments, when the user edits a document that has already been transformed, once the user saves and closes the document, the document is automatically retransformed so that the changes are reflected in the web page. In other embodiments, if the user deletes the source document, the web page associated with the document is also automatically deleted. In other embodiments, if a web page is deleted, the extracted resources associated with the web page are deleted as well.

In some embodiments, transformation is configured to automatically run whenever a document is loaded into the document library or according to certain rules defined by the user. In other embodiments, the user is prompted regarding whether not to run transformation upon loading a document into the document library. In yet other embodiments, the user can perform transformation on a set of documents in a library at one time.

In other embodiments, transformation can be done without first uploading a document into a document library. For example, in one embodiment, transformation can be done on a client computer. In another embodiment, transformation can be started while the document resides on a client computer, and a first part of the transformation process involves automated uploading of the document to a desired document library.

In alternative embodiments, a preview transformation process is provided that allows the user to preview transformation. The example preview process does not result in creation of a web page that is accessible by others, but instead allows the user to preview how the transformed web page looks before actually proceeding with the entire transformation process.

In some embodiments, the transformation module is extendable such that additional document converters can be added to allow for the transformation of additional document types. In other embodiments, additional image converters can be added to the transformation module to allow the transformation module to convert additional types of images into web-compliant image types.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A computer-readable storage medium configured to execute modules, comprising:
    a first user interface module having first and second column portions, the first user interface module being programmed to display document styles of a document in the first column portion and styles of a web page in the second column portion, the first user interface module being programmed to allow a user to select a document style from the document styles and to select a corresponding style from the styles of the web page on a same interface which the first and second column portions are presented;
    a second user interface module including:
    a conversion section, the conversion section allowing the user to choose between styles that are used to transform the document, the styles including a first style that approximates formatting of the document, a second style that maps the document to particular style of the web page, and a third style that transforms an extensible markup language (XML) document to the web page;
    a page layout section, the page layout section allowing the user to select between different layout templates to define how the web page is rendered; and
    a page location section, the page location section allowing the user to choose to create and store the web page in a current publishing site or to select a publishing site;
    a mapping module programmed to map the document styles of the document to the styles of the web page;
    a resource extraction module programmed to extract resources from the document, the extracted resources being stored at a location defined by a content type, and each of the extracted resources being assigned a name to uniquely identify each resource;
    a conversion module programmed to convert contents of the document into hypertext markup language based on the map of the mapping module;
    a storage module programmed to store the document in a document library;
    a selection module programmed to allow the user to select the document from a menu to transform the document to the web page; and
    a rendering module programmed to render the web page based on the hypertext markup language, and to output the web page.

2. The computer-readable storage medium of claim 1, further comprising an application programmed to create the document.

3. The computer-readable storage medium of claim 1, wherein the conversion module is further programmed to create links to the extracted resources in the hypertext markup language.

4. The computer-readable storage medium of claim 1, further comprising an image processing module programmed to process image resources extracted from the document.

5. The computer-readable storage medium of claim 4, wherein the image processing module is further programmed to convert the image resources to a format compatible with the web page.

6. A computer-implemented method for transforming a document to a web page, the method comprising:
    allowing, at a computing device, a user to select a document style from document styles of a document in a first column portion and a corresponding style from styles of the web page in a second column portion on a same interface which the first and second column portions are presented;
    allowing the user to choose between styles that are used to transform the document, the styles including a first style that approximates formatting of the document, a second style that maps the document to particular style of the web page, and a third style that transforms an extensible markup language (XML) document to the web page;
    allowing the user to select between different layout templates to define how the web page is rendered;
    allowing the user to choose to create and store the web page in a current publishing site or to select a publishing site;
    mapping the document styles in a document to the styles of the web page; extracting resources from the document;

storing the extracted resources at a location defined by a content type; assigning each of the extracted resources a name to uniquely identify each resource;

converting contents of the document into hypertext markup language based on the mapping;

rendering the web page based on the hypertext markup language; and outputting the web page.

7. The method of claim 6, further comprising:

creating the document; and uploading the document to a server.

8. The method of claim 6, further comprising linking the extracted resources in the hypertext markup language.

9. The method of claim 6, further comprising storing the extracted resources to a particular location on a server.

10. The method of claim 6, further comprising processing image resources extracted from the document.

11. The method of claim 10, wherein the step of processing further comprises converting the image resources to a format compatible with the web page.

12. A computer-readable storage medium having computer-executable instructions for performing steps comprising:

allowing, at a computing device, a user to select a document style from document styles of a document in a first column portion and a corresponding style from styles of a web page in a second column portion on a same interface which the first and second column portions are presented;

allowing the user to choose between styles that are used to transform the document, the styles including a first style that approximates formatting of the document, a second style that maps the document to particular style of the web page, and a third style that transforms an extensible markup language (XML) document to the web page;

allowing the user to select between different layout templates to define how the web page is rendered;

allowing the user to choose to create and store the web page in a current publishing site or to select a publishing site;

mapping the document styles in a document to the styles of the web page;

extracting resources from the document;

storing the extracted resources at a location defined by a content type;

assigning each of the extracted resources a name to uniquely identify each resource;

converting contents of the document into hypertext markup language based on the mapping;

rendering the web page based on the hypertext markup language; and outputting the web page.

13. The computer-readable storage medium of claim 12, further comprising:

creating the document; and uploading the document to a server.

14. The computer-readable storage medium of claim 12, further comprising linking the extracted resources in the hypertext markup language.

15. The computer-readable storage medium of claim 12, further comprising storing the extracted resources to a particular location on a server.

16. The computer-readable storage medium of claim 12, further comprising processing image resources extracted from the document.

17. The computer-readable storage medium of claim 16, wherein the step of processing further comprises converting the image resources to a format compatible with the web page.

\* \* \* \* \*

UNITED STATES PATENT AND TRADEMARK OFFICE
CERTIFICATE OF CORRECTION

PATENT NO. : 7,627,592 B2  
APPLICATION NO. : 11/013765  
DATED : December 1, 2009  
INVENTOR(S) : Sterling John Crockett et al.

It is certified that error appears in the above-identified patent and that said Letters Patent is hereby corrected as shown below:

In column 10, line 7, in Claim 1, delete "extensible" and insert -- eXtensible --, therefor.

In column 10, line 60, in Claim 6, delete "extensible" and insert -- eXtensible --, therefor.

In column 11, line 34, in Claim 12, delete "extensible" and insert -- eXtensible --, therefor.

Signed and Sealed this
Fifteenth Day of February, 2011

David J. Kappos
*Director of the United States Patent and Trademark Office*